Patented Nov. 8, 1932

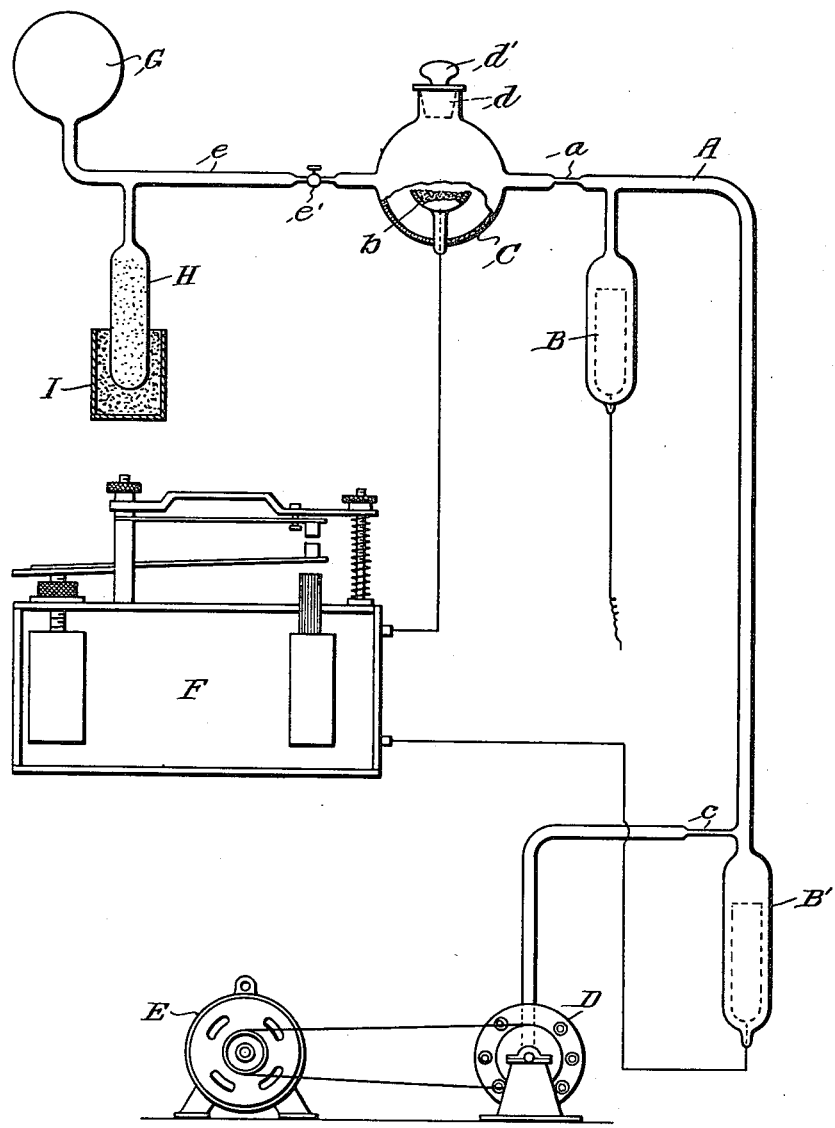

1,886,475

UNITED STATES PATENT OFFICE

JULES J. FLORIMONT, OF PARIS, FRANCE, ASSIGNOR TO THE RISLER CORPORATION OF AMERICA, OF KANSAS CITY, MISSOURI, A CORPORATION OF DELAWARE

PROCESS AND APPARATUS FOR MAKING VACUUM TUBES

Application filed June 28, 1927, Serial No. 202,129, and in France July 3, 1926.

The invention relates to a process and apparatus for making vacuum tubes.

In order to obtain a high vacuum in incandescent or luminescent lamps, as well as to rid the electrodes of those tubes completely from their occluded gases, vacuum pumps are generally used. The latter, however, are slow.

The process forming the subject matter of the present invention is designed to shorten the duration of these time-consuming operations to a very considerable extent. The invention consists in its essential features in vaporizing by means of an electric discharge through the tube by a high tension current, a volatile solid such as mercurous chloride and $Hg_2Cl_2$ enclosed in a suitable receptacle communicating with the tube to be evacuated. The volatilized particles of the chloride adsorb almost instantaneously polyatomic gases such as hydrogen $H_2$, nitrogen $N_2$ contained in the tube, and are eliminated together with these gases through aspiration by means of a pump or other analogous apparatus. In this way it is possible to obtain in an extremely short time the desired vacuum in the tube.

The "degasing" of the tube electrodes is simultaneously effected in a short time owing to the action of the volatilized particles on these electrodes.

The same system of evacuation may likewise be applied to the known process of purifying by means of charcoal the rare gases (neon, helium, krypton and others) to be introduced into the luminescent tubes to free them from any foreign gases likely to be mixed with them.

Any high tension current may be used to produce an electric discharge in the tube for the purpose of heating and volatilizing the mercurous chloride or other volatile solid. Also any other suitable means may be employed for supplying the necessary heat for vaporizing or volatilizing the material used.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

The figure of the drawing is a diagrammatic view of an apparatus for carrying out the present invention.

In the accompanying drawing in which is illustrated one embodiment of the invention A designates a luminescent tube of any desired construction in which it is desired to make a high vacuum and B and B′ are the ordinary electrodes of the said tube made of electrolytic copper or other metal. The said tube is connected at or near one end by means of a small tube $a$ with a glass receptacle C containing an electrode in the form of a small cup in which is placed the mercurous chloride or other volatile material. At the other end the vacuum tube is connected by a small tube $c$ with a pump D which is driven by an electric motor E or other suitable means. The mercurous chloride in the cup electrode $b$ and the electrode B′ are electrically connected with a source of high tension current which may be an ordinary spark coil or transformer F. Either an alternating or a continuous high tension current may be employed.

Under the action of the discharge produced by the high tension electric current, the mercurous chloride is rapidly volatilized and its particles adsorb the residual gases of the tube A as well as the gases occluded in the electrodes B and B′ and are removed by the pump D. When the desired vacuum has been obtained in the tube A and the electrodes freed from occluded gases the tube A may be sealed off and detached and is then ready for use. The receptacle C is provided with an opening $d$ normally closed by a stopper $d'$ and adapted to permit the supply of mercurous chloride or other volatile material to be replenished as it becomes exhausted.

With the present process it is possible to evacuate in one minute a tube 6m. long and 10mm. in diameter, and its electrodes may be freed from occluded gases in 75 minutes.

Also with the same apparatus, foreign gases may be removed from the rare gases (neon and others) which may be desirable to introduce into the luminescent tube A. The rare gas under consideration, for example, neon is contained in a receptacle G which is connected by means of a branch tube e with the mercurous chloride receptacle C. Sealed to the branch tube e is a tube H filled with absorbent carbon. The absorbent carbon may consist of charcoal which is cooled to about −90° C. by carbon dioxide snow and ethyl chloride contained in a receptacle I. The branch tube e is provided with a glass stop cock e' or other suitable valve and by operating the pump D and also producing an electrical discharge in the tube, the neon gas contained in the receptacle G will be purified as it passes into the tube A. This purifying of neon gas is effected in an extremely short time. Preliminary to vaporizing the mercurous chloride, the electrodes B and B' are preferably heated by connecting the same with the transformer F after which operation, the electrode B is disconnected from the transformer and the cup electrode b is connected therewith. During the process of removing the residual and occluded gases from the tube A, the glass stop cock which controls the flow of the neon gas is closed and remains closed until the residual and occluded gases are removed from the tube A.

What is claimed is:

1. A process of making vacuum tubes consisting in heating the electrodes of a tube and causing electrical discharges in the said tube by a high tension electric current, simultaneously vaporizing a mercury compound by the said electric current, and then passing the vapor through the tube to remove occluded and residual gases from the said tube.

2. A process of making vacuum tubes consisting in heating the electrodes of a tube and causing electrical discharges in the said tube by a high tension electric current, simultaneously vaporizing a mercury chloride by the said electric current, and then passing the vapor through the tube to remove occluded and residual gases from the said tube.

3. In an apparatus for making vacuum tubes, a receptacle having a cup electrode contained within it and adapted to receive a volatile solid, said receptacle having an outlet adapted to be placed in communication with a tube, means for passing a high tension electric current through the tube and the electrode of the receptacle when the tube and receptacle are connected, and means for passing through the receptacle and into the tube a gas to be introduced into the tube whereby foreign gases are removed from the said gas.

4. A process of making vacuum tubes including heating a temporary volatile electrode at one end of a tube by causing an electrical discharge between said electrode and the permanent electrode at the opposite end of the tube to volatilize said temporary electrode, exhausting the tube of the vapor formed by volatilizing the temporary electrode from a point adjacent said permanent electrode, passing a gas over said temporary electrode into the tube, and disconnecting said temporary electrode from the tube.

In testimony whereof, I have hereunto set my hand.

JULES J. FLORIMONT.